United States Patent [19]

Doucet

[11] 4,374,231

[45] Feb. 15, 1983

[54] ADHESIVE COMPOSITION

[75] Inventor: Jos Doucet, Kessel-Lo, Belgium

[73] Assignee: Raychem Corporation, Menlo Park, Calif.

[21] Appl. No.: 262,871

[22] Filed: May 12, 1981

[30] Foreign Application Priority Data

May 13, 1980 [GB] United Kingdom ............... 8015914

[51] Int. Cl.$^3$ ............................................. C08L 77/00
[52] U.S. Cl. ................................ 525/179; 156/309.6; 525/183
[58] Field of Search ............................. 525/179, 183; 260/23 AR, 18 N

[56] References Cited

U.S. PATENT DOCUMENTS

| | | | |
|---|---|---|---|
| 3,582,507 | 6/1971 | Peermann | 260/23 AR |
| 4,018,733 | 4/1977 | Lopez | 525/183 |
| 4,105,709 | 8/1978 | Iwami et al. | 260/42.18 |
| 4,132,690 | 1/1979 | Eeernstman | 525/18 N |
| 4,160,790 | 7/1979 | Mason | 525/179 |
| 4,160,790 | 7/1979 | Mason et al. | 525/179 |
| 4,246,371 | 1/1981 | Meyer | 525/183 |
| 4,299,744 | 11/1981 | Stewart | 525/183 |

FOREIGN PATENT DOCUMENTS

| | | | |
|---|---|---|---|
| 740501 | 8/1966 | Canada | 525/183 |
| 55-89364 | 7/1980 | Japan | 525/183 |
| 55-90575 | 7/1980 | Japan | 525/179 |
| 1531976 | 11/1978 | United Kingdom . | |

OTHER PUBLICATIONS

Chemical Abstracts, vol. 83, 1975, p. 77, Abstract No. 80667z.

*Primary Examiner*—Paul Lieberman
*Attorney, Agent, or Firm*—Herbert G. Burkard

[57] ABSTRACT

A hot-melt adhesive composition comprising a polyamide and up to 10% by weight of the polyamide of an ethylene acrylic terpolymer and preferably also an acrylic rubber. The acrylic rubber is preferably a copolymer of ethyl acrylate, butyl acrylate, methoxy ethyl acrylate and ethoxy ethyl acrylate.

15 Claims, 1 Drawing Figure

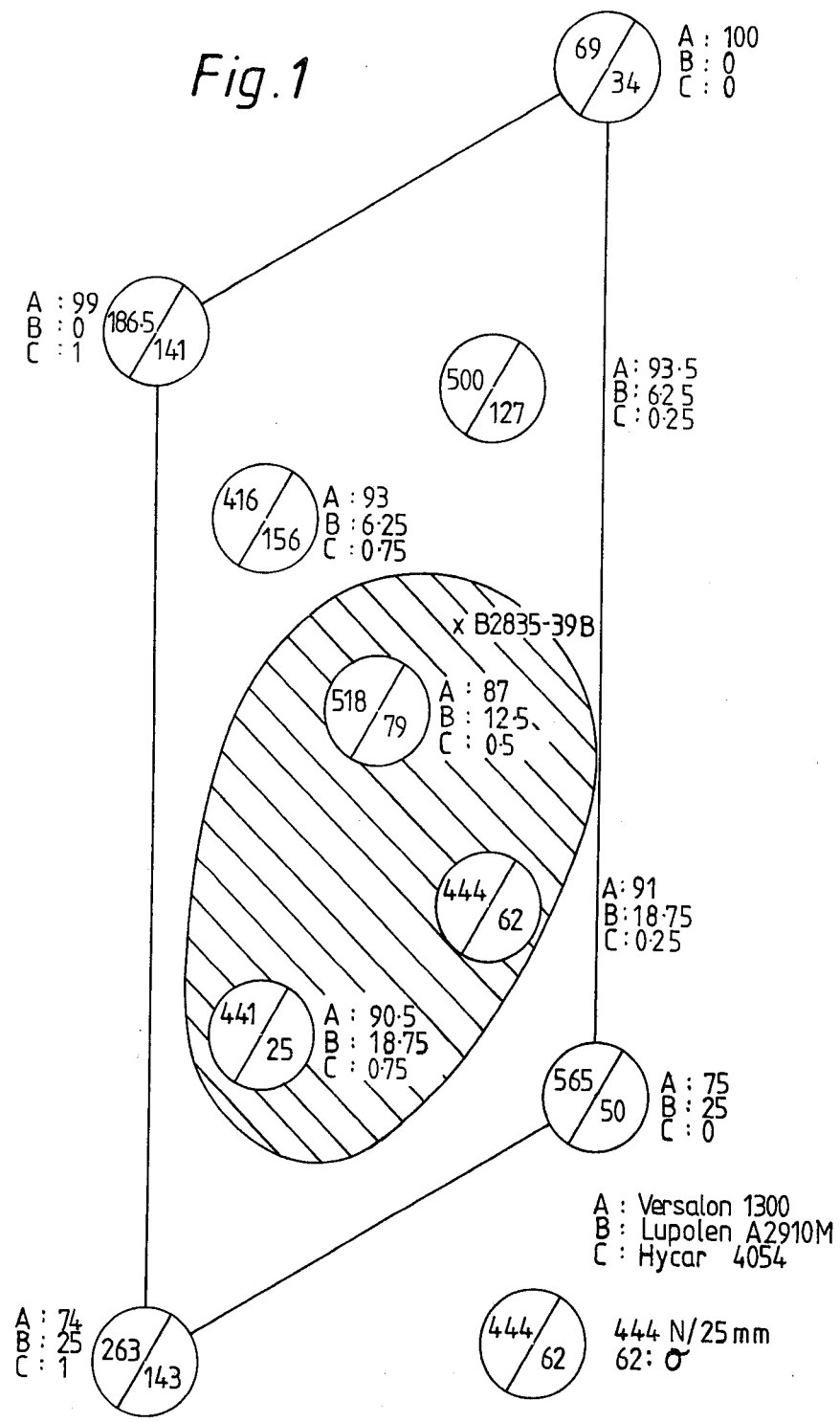

ADHESIVE COMPOSITION

This invention relates to a hot-melt adhesive composition, articles coated therewith, and methods of using the same.

Hot-melt adhesives are well known, and one known kind based on polyamides has found particular utility in connection with heat-recoverable products, such as heat-shrinkable sleeves and end caps for jointing, encapsulation, insulation, corrosion protection, and termination of electrical equipment, especially wires and cables, and service lines, e.g. oil pipes. Other heat-recoverable articles to which the adhesives of the present invention may advantageously be applied include so-called "wrap-around" sleeves as described, for example, in U.S. Pat. No. 3,379,218 and British Pat. Nos. 1,155,470, 1,211,988 and 1,346,479, and the "XAGA" cable splice described in British Pat. No. 1,431,167. However, the adhesives may, of course, be used in other applications not involving heat-recoverable products. One such application is, for example, in the ductseal devices described in Bristish Patent Application No. 45725/76.

In use, especially in heat-shrinkable cable sleeves and end caps as aforesaid, the adhesive compositions are frequently required to adhere to polyethylene, for example polyethylene cable sheathing. It is notoriously difficult to obtain good adhesion to untreated polyethylene surfaces, and it is therefore the usual practice to treat the polyethylene surfaces, for example by flame brushing or corona discharge, to improve their adhesion characteristics. One aspect of the present invention provides adhesive compositions which are useful in this context having advantageous low temperature properties by virtue of blending ethylene/acrylic terpolymers with the polyamides. The term ethylene acrylic terpolymer is used herein to refer to terpolymers of ethylene with two or more acrylic acids or acrylates provided that the terpolymer has free carboxylic acid groups, a preferred copolymer being that sold by BASF under the Trade Mark "LUPOLEN A 2910 M" (ethylene/acrylic acid/butyl acrylate).

According to a further preferred embodiment of the present invention, it has been found that the adhesion of the hot melt polyamide adhesives to untreated polyethylene surfaces can be dramatically improved by adding to the polyamide composition a minor amount (not more than 10 percent by weight of the polyamide) of an acrylic rubber. Preferably, the amount of acrylic rubber will be not more than 5 percent by weight, more preferably not more than 1 percent by weight, and most preferably from 0.25 to 0.75 per cent by weight of the polyamide.

The composition according to the invention (whether or not it contains an acrylic rubber) preferably includes the aforementioned ethylene acrylic terpolymers in amounts up to 20 percent by weight of the polyamide, more preferably 10 to 20 percent by weight.

The term "acrylic rubber" is used herein to refer to acids and acrylates, which may contain reactive cure sites such as epoxy, carboxyl or halogen groups. A preferred acrylic rubber that contains reactive cure sites is that sold by Goodrich under the Trade Mark "HYCAR 4054", having a Mooney viscosity of 25 to 40, and a preferred acrylic rubber having no cure sites is that sold by Montedison under the trade name Ar152.

The main polyamides used in the present invention preferably have a number average molecular weight of from 2,000 to 10,000, a softening point of from 70° C. to 150° C. preferably 90° to 150° C. and an amine equivalent of from 0 to 400, preferably 70 to 400 (amine equivalent being the number of milliequivalents of perchloric acid required to neutralise one kilogram of the polyamide). Especially suitable polyamides for use in the present invention are based on dibasic acids, especially dimer acids, and although small amounts of tribasic and higher acids, e.g. trimer acid, may be present it is strongly preferred that they should not total more than 10% by weight of the acid component of the polyamide.

Typical polyamides are the condensation interpolymers of at least one diamine with one or more dibasic acids, with dimer acid being the preferred major dibasic acid component. These polyamides may be obtained by conventional amidification procedures and are generally prepared by reacting a molar excess of the amine group containing molecules with the carboxylic acid group containing molecules. The amount of excess amine utilised should be sufficient to provide a polyamide having an amine equivalent up to 400, preferably from 70 to 400, and especially from 90 to 200.

Suitable diamines and acids are described, for example, in U.S. Pat. No. 4,181,775.

As aforesaid, the polyamides used in the practice of the present invention preferably have a number average molecular weight ranging from 2,000 to 10,000, more preferably from 3,000 to 7,000. The number average molecular weight is appropriately measured by vapour phase osmometry (see "Polymer Handbook" 2nd edition, John Wiley and Sons, New York and "Polymer Science" Book 1, pp. 140–41, North Holland Publishing Company, Amsterdam).

For the adhesive to exhibit good low temperature properties, (i.e. it should not be brittle or frangible under severe winter conditions), it is preferable for the polyamide to have a glass transition temperature below 10° C., preferably below 0° C. The glass transition temperature may be measured by differential scanning calorimetry (see, for example, "The reagent heat" A. A. Duswalt, Industrial Research, July 1975, p. 42) or by thermochemical analysis (see, for example, "Application of Thermal Analysis to the Study of Polymer", W. E. Collins, Educational Seminar Pittsburgh Conference on Analytical Chemistry and Applied Spectroscopy, Cleveland, Ohio, Mar. 1-6, 1970).

An especially preferred use for the adhesives of the present invention is with heat-recoverable products such as sleeves and end caps, usually made from crosslinked olefin polymers, especially polyethylene, and the present invention accordingly provides a heat-recoverable article provided with a layer of such an adhesive. In these articles, as discussed above, it is desirable for the adhesive to melt and flow simultaneously with the recovery of the article. Accordingly, the polyamides used in the adhesives of the present invention preferably have a softening point lying in the range of from 70° C. to 135° C., as measured by the ring-and-ball softening point method according to ASTM E-28.

As indicated above, the polyamides used in the present invention may readily be prepared by conventional techniques. Some commercially available polyamides suitable for use in the present invention are described in U.S. Pat. Nos. 3,249,629 and 3,449,273 and amongst especially suitable materials there may be mentioned Macromelt 6301 (formerly Versalon 1300), Versalon 1140, Versalon TPX 600 and Type 401 (all available from General Mills Chemicals, Inc.) and Eurelon 2130 and Eurelon 1140 (both available from Schering AG). These materials are all believed to be based on dimer acids, and have the following properties.

| Material | Softening Point °C. | Viscosity Poise | Mol. Weight | Glass Transition Temp. °C. | Amine Equivalent |
|---|---|---|---|---|---|
| Versalon 1300 | c. 95 | c. 50(200° C.) | c.6500 | c. −15 | c.130 |
| Versalon 1140 | c.140 | c.100(200° C.) | c.4000 | c. 0 | c.140 |
| Versalon TPX 600 | c.135 | c.200(225° C.) | c.4000 | c. −5 | c.130 |
| Type 401 | c.120 | c. 90(200° C.) | c.3500 | c.−20 | c.140 |
| Eurelon 2130 | c.130 | c. 35(200° C.) | c.4000 | c.−15 | c.125 |
| Eurelon 1140 | c.140 | c.100(200° C.) | c.4000 | c. 0 | c.140 |

Other especially suitable polyamides may be made from substantially pure dimer acids.

The most preferred polyamides for the present purposes have a molecular weight greater than 6,000, and currently most preferred material being Versalon 1300.

The flow temperature range of compositions based on the preferred polyamides having a molecular weight greater than 6000, e.g. Versalon 1300, can be shifted by including a quantity, preferably 5 to 20% by weight based on the preferred polyamide, of a liquid polyamide such as that sold under the Trade Mark "Versamid 100" which may have an amine equivalent from almost 0 to about 3000. This tends to lower the flow temperature range without any unacceptable alteration therein, or adverse effects on the other desirable properties of the adhesive composition, provided that the liquid polyamide is added after any reaction between the rubber and the main polyamide. If added before the reaction, the liquid polyamide could tend to react vigorously with the acrylic rubber to produce a polymer unsuitable for the present purposes.

It will be understood that the present adhesive compositions may be compounded with the usual additives such as fillers, tackifiers, anti-oxidants, stabilisers, extenders, fungacides and other known compounding adhesive compositions if desired. They are preferably used alone or with the addition only of minor amounts of anti-oxidant. The present adhesive compositions are preferably prepared by melt-mixing the ingredients.

The following Examples illustrate the invention:

EXAMPLE 1

A hot melt adhesive composition was prepared by blending the following components:

| Versalon 1300 | 100 parts |
| Lupolen A 2910 M | 10 parts |
| Irganox 1010 | 1 part | in a sigma blade mixer for 45 minutes. The composition was pressed into a 1 mm thick plaque at 150° C. for 30 seconds and the peel strength of the adhesive to untreated polyethylene surfaces was determined in accordance with Raychem test specification RK4012. The peel strength of the composition was compared with that of a composition having the same composition but with the addition of 0.3 parts by weight of Hycar 4054 (trade name).

Irganox 1010 is a hindered phenol antioxidant; Hycar 4054 is an acrylic rubber as aforesaid based on ethyl/butyl acrylate, methoxyethylacrylate, ethoxyethylacrylate, with reactive cure sites (thought to be epoxidised carboxyl groups); Lupolen A 2910 M is the aforementioned ethylene acrylic terpolymer and is based on ethylene/acrylic acid/butyl acrylate; and Versalon 1300 is the aforementioned preferred polyamide.

These comparative tests indicated that the addition of 0.3 parts of the acrylic rubber produced improvements in the peel adhesion to untreated polyethylene of the order of 80 to several hundred percent, with some variation between different batches of Versalon 1300. It will be understood that the term "untreated polyethylene" refers to poly ethylene which has not been subjected to flame or corona treatment to improve its surface adhesion characteristics.

A matrix of formulations varying the amounts of the main ingredients as indicated in the accompanying drawing, was prepared and tested as above, the preferred adhesives for use on untreated polyethylene being those whose composition falls within the shaded area of the drawing.

In the drawing the figures given for A, B and C refer to the percentage by weight of Versalon 1300, Lupolen A 2910 M and Hycar 4054 respectively in the composition; the figures in the upper left hand half of the circles indicate the peel strength of that composition to untreated polyethylene and the figures in the lower right hand half of the circles indicate the standard deviation of the peel strength values over 72 tests.

EXAMPLE 2

The following composition:

|  | parts by weight |
|---|---|
| Versalon 1300 | 100 |
| Lupolen A 2910 M | 10 |
| *Elaprim AR 152 | 0.3 |
| Irganox 1010 | 1.5 |

*Elaprim AR 152 is an acrylic rubber was blended on a two roll mill at a temperature below 90° C. until homogeneous, and then pressed for 10 minutes at 150° C. into a 1 mm thick plaque. The peel strength to untreated polyethylene substrates was determined as above and had a value of 337 N/25 mm.

EXAMPLE 3

The following formulations A and B were blended and pressed into plaques as described in Example 2. The peel strength of the composition to untreated polyethylene was determined as in Raychem test specification RK4012.

| Components | Formulation (parts by weight) | |
|---|---|---|
|  | A | B |
| Versalon 1300 | — | 100 |
| Schering Polyamide (1) | 100 | — |
| Lupolen A 2910 M | 20 | 10 |
| Hycar 4054 | 0.5 | — |
| Hycar 4043 (2) | — | 0.3 |
| Irganox 1010 | 1 | 1.5 |
| Peel strength at Room | 493 | 278 |

-continued

| | Formulation (parts by weight) | |
|---|---|---|
| Components | A | B |
| Temp. (N/25 mm) | | |

(1) Development polyamide hot-melt adhesive having an amide equivalent of 1.1.
(2) Ethyl acrylate/butyl acrylate rubber with 1.5% reactive chlorine.

I claim:

1. A hot-melt adhesive composition comprising a polyamide based on one or more dimeric fatty acids and an ethylene/acrylic acid/butyl acrylate terpolymer containing free acid groups.

2. A composition according to claim 1, including up to 20 percent of the ethylene/acrylic acid/butyl acrylate terpolymer based on the weight of the polyamide.

3. A composition according to claim 1 which includes up to 10 percent by weight of the polyamide of an acrylic rubber.

4. A composition according to claim 3, comprising up to 5 percent by weight of the acrylic rubber.

5. A composition according to claim 4, comprising up to 1 percent by weight of the acrylic rubber.

6. A composition according to claim 5, comprising 0.25 to 0.75 percent by weight of the acrylic rubber.

7. A composition according to claim 3, wherein the acrylic rubber is a copolymer of ethyl acrylate, butyl acrylate, methoxy ethyl acrylate, and ethoxy ethyl acrylate.

8. A composition according to claim 7, wherein the acrylic rubber has a Mooney viscosity of 25 to 40.

9. A composition according to claim 1, wherein the polyamide has a molecular weight greater than 6,000.

10. A hot-melt adhesive composition comprising a polyamide based on one or more dimeric fatty acids, an ethylene/acrylic acid/butyl acrylate terpolymer, and an acrylic rubber in proportions lying within the shaded area of the diagram shown in the accompanying drawing.

11. A composition according to claim 1, including a liquid polyamide in addition to the main polyamide.

12. A composition according to claim 11, comprising 5 to 20% by weight of a liquid polyamide based on the weight of the main polyamide 13. A heat-recoverable article carrying a coating of an adhesive composition according to claim 1.

14. A composition according to claim 2, including 10 to 20 percent of the ethylene/acrylic acid/butyl acrylate terpolymer, based on the weight of the polyamide.

15. A hot-melt adhesive composition comprising a polyamide based on one or more dimeric fatty acids and from 6.7 percent to 33 percent, based on the weight of the polyamide, of an ethylene/acrylic acid/butyl acrylate terpolymer containing free acid groups.

* * * * *